(12) United States Patent
Tam et al.

(10) Patent No.: US 7,206,259 B2
(45) Date of Patent: Apr. 17, 2007

(54) ULTRASOUND SENSOR AND ULTRASOUND MEASUREMENT DEVICE

(75) Inventors: Hwa-yaw Tam, Hong Kong (HK); Helen L. W. Chan, Hong Kong (HK); Bai-ou Guan, Hong Kong (HK)

(73) Assignee: The Hong Kong Polytechnic University, Kowloon (HK)

( * ) Notice: Subject to any disclaimer, the term of this patent is extended or adjusted under 35 U.S.C. 154(b) by 102 days.

(21) Appl. No.: 11/014,102

(22) Filed: Dec. 15, 2004

(65) Prior Publication Data

US 2006/0126435 A1    Jun. 15, 2006

(51) Int. Cl.
*G01H 9/00*    (2006.01)

(52) U.S. Cl. .................................... 367/149

(58) Field of Classification Search ............... 367/140, 367/149; 250/227.16; 385/12, 13
See application file for complete search history.

(56) References Cited

U.S. PATENT DOCUMENTS 6,630,658 B1 * 10/2003 Bohnert et al. ......... 250/227.16
2006/0126435 A1 * 6/2006 Tam et al. .................. 367/149

* cited by examiner

*Primary Examiner*—Dan Pihulic
(74) *Attorney, Agent, or Firm*—Alix, Yale & Ristas, LLP

(57) ABSTRACT

An ultrasound sensor consists of an optical fiber having an active portion with high birefringence and two non-active portions located at each end of the active portion. A bragg grating is provided in the fiber. An ultrasound measurement device includes an ultrasound sensor with an excitation source for the fiber and an analysis unit connected to the fiber.

15 Claims, 6 Drawing Sheets ced in series,
ULTRASOUND SENSOR AND ULTRASOUND MEASUREMENT DEVICE

BACKGROUND TO THE INVENTION

1. Field of the Invention

The present invention relates to ultrasound sensors and to ultrasound measurement device.

2. Background Information

The measurement of ultrasound waves has been attracting considerable interest in the medical sector due to the need for categorization of ultrasonic equipment and safety assessment of patient exposure. Existing methods for measurement of ultrasonic fields are primarily based on the use of Polyvinylidene Fluoride (PVDF) sensors. However, this type of sensor is susceptible to electromagnetic interference and cannot withstand high-power ultrasonic fields.

In order to resolve narrowly focused ultrasound beams it is necessary to use a sensor with a small active element. An additional problem with Polyvinylidene Fluoride sensors is that they are difficult to fabricate with a small active element.

SUMMARY OF THE INVENTION

It is an object of the present invention to provide an ultrasound measurement device comprising an optic fiber sensor that overcomes or ameliorates the above disadvantages.

According to a first aspect of the invention there is provided an ultrasound sensor comprising an optical fiber having an active portion with first and second ends and high birefringence, and two non-active portions located at the first and second ends of the active portion respectively, and a grating provided in the fiber.

Preferably, the grating is in the active portion of the fiber.

Preferably, the grating comprises first and second gratings spaced apart and having overlapping spectrums. Preferably, the first grating is 10 mm long with a reflectivity of larger than 99% and the second grating is 3 mm long with a reflectivity of substantially 90%.

Preferably, the active portion is an Er/Yb co-doped fiber.

According to a second aspect of the invention there is provided an ultrasound measurement device comprises the ultrasound sensor, an excitation source for the fiber and an analysis unit connected to the fiber.

Preferably, the excitation source is a 980 nm pump laser.

Preferably, the analysis unit includes a photo-detector and a signal processor.

Preferably the device further includes a shield over or about the fiber, the shield having an opening for permitting an ultrasound wave to become incident on the fiber.

Preferably the device further includes two or more of said fibers connected in series or parallel.

Further aspects of the invention will become apparent from the following description which is driven by way of example only to illustrate the invention.

BRIEF DESCRIPTION OF THE DRAWINGS

The invention will now be described with reference to the accompanying drawings in which.

DETAILED DESCRIPTION OF THE INVENTION

Figure 1:
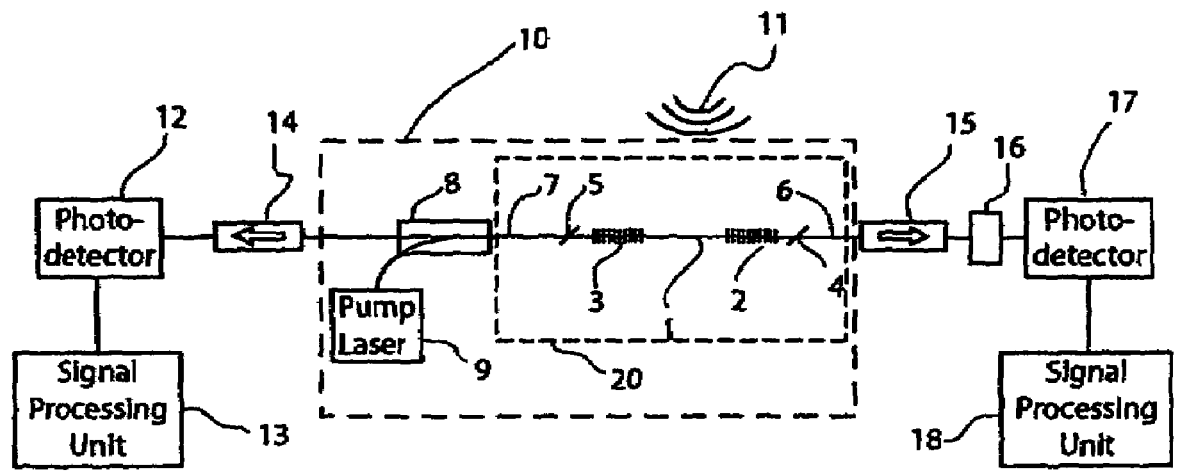
FIG. 1 is a schematic block diagram of an ultrasound sensor and ultrasound measurement device.

A preferred embodiment of an ultrasound sensor 10 is shown in FIG. 1. The sensor comprises a birefringence fiber grating laser 20 including an active doped fiber 1 with two fiber Bragg gratings 2 and 3. Gratings 2 and 3 are either identical uniform Bragg gratings or have overlapping spectrums which limit the line width of the laser output enabling single longitudinal operation. A typical embodiment includes 1550 nm gratings written into an Er/Yb co-doped fiber with a separation of 10 mm. The first grating is 10 mm long with a reflectivity of larger than 99% and the second grating is 3 mm long with a reflectivity of around 90%.

Normal optical fibers 6 and 7 are spliced to either end of the active fiber 1. The splice points are indicated by reference numerals 4, 5. The birefringence of the fiber laser is introduced during the fiber fabrication process and grating inscription.

Pump power is launched into the fiber grating laser 20 from an external pump source 9 via an optical fiber coupler 8. A typical embodiment comprises a 980 nm pump. The laser signal power emits from both end fibers 6 and 7 of the fiber laser 20.

In an ultrasound measurement device, isolators 14, 15 and photo-detectors 12, 17 are provided at each end of the sensor 10. The isolators 14 and 15 prevent any unwanted reflected light entering into the fiber grating laser 20. An optical filter 16 is located between the isolator 15 and photo-detector 17 at the end opposite the pump source 9. The filter 16 is suitable for letting the signal power through while blocking any unabsorbed pump light.

A signal processing unit 13, 18 is connected to each photo-detector 12, 17 for generating an output signal related to a received acoustic wave 11 incident on the sensor 10. It also provides the frequency and amplitude of the acoustic wave 11 as well as the temperature surrounding the sensor 10.

In practice, the acoustic signal information need not be measured at both ends of the sensor. It is sufficient to obtain the information from just one end. The unused end is terminated to have a high return loss. In such an embodiment only, say, isolator 15, filter 16, photo-detector 17 and signal processor 18 present.

When excited by the pump 9 the fiber grating laser 20 operates in two orthogonal eigenpolarization modes and emits light at two frequencies spaced about 1 GHz apart. The emission wavelength of the laser 20 is determined by the fiber gratings and can be any wavelength within the gain profile of the materials doped in the active fiber 1. The frequency difference between the two polarizations of the output light is determined by the birefringence of the laser 20. This frequency difference, which is equal to the beat frequency, is given by:

$$\Delta v = \frac{Bv}{n}$$

where $\Delta v$ is the polarization beat frequency (frequency difference), $v$ is the lasing frequency, B is the birefringence of the fiber and n is the refractive index of the fiber.

The frequency difference is measured using the photo-detectors 12, 17 and the signal processors 13, 18. When the fiber laser 20 is subjected to the acoustic wave 11 the acoustic pressure changes the fiber refractive index owing to the photoelastic effect. For acoustic wavelengths much larger than the fiber diameter, the induced index change is isotropic. For acoustic wavelengths comparable with or much smaller than the fiber diameter, the acoustic pressure induces different index changes along and perpendicular to the direction of the ultrasound wave and so changes the fiber birefringence. For a high frequency, that is >1 MHz, ultrasonic acoustic wave incident normally upon the fiber 1 the change in birefringence is driven by:

$$\Delta B = k p_a \sin \omega_a t \cos 2\theta$$

where k is a constant depending on acoustic frequency and photoelastic coefficients and reflective index of the optical fiber, $p_a$ and $\omega_a$ are the amplitude and angular frequency of the acoustic pressure respectively and $\theta$ is the angle between the polarization axis of the fiber and the propagation direction of the acoustic wave.

The modulation of the laser birefringence introduces sidebands in the RF spectrum of the sensor output. The frequency separation between the sidebands and beat frequency is equal to the acoustic frequency of the ultrasound wave 11 and the total intensity of the sidebands is proportional to the intensity of the ultrasound wave 11.

In most practical situations the acoustic pressure along the fiber is not uniform. Provided that the active fiber 1 is parallel to the ultrasound wave 11 the induced beat frequency change is given by:

$$\delta \Delta v = \Delta v \frac{k \int_0^L p_a dl}{BL} \sin \omega_a t \cos 2\theta$$

where L is the cavity length of the distributed Bragg reflector (DBR) fiber laser and so the readout of the sensor is the line integral of the acoustic pressure amplitude across the laser cavity.

The beat frequency also exhibits a linear relationship with temperature and so is used to measure temperature. Likewise, the emission wavelength is also temperature dependent and is used to measure temperature.

In the equation for beat frequency $\Delta v$ given above v, B and n are all temperature dependent and so $\Delta v$ changes with temperature. In contrast to changes with ultrasound pressure, changes with temperature are slow and so simultaneous measurement of these two parameters can be easily achieved by filtering the shift in frequency of the carrier.

Figure 7:
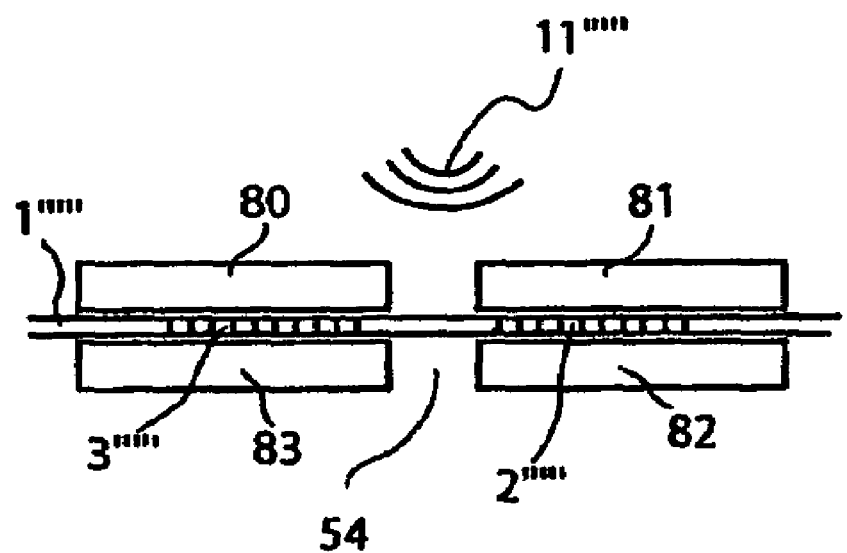
FIG. 7 is a diagram showing the ultrasound sensor with the detection size adjusted/reduced using an aperture.

The sensor element size is determined by the sensing area of the fiber 1. FIG. 7 illustrates how to reduce the sensing area of the fiber. A plurality of shields 80, 81, 82, and 83 are arranged proximate the fiber 1. Openings 54 are provided between the shields 80, 81, 82, and 83 to promote acoustic signals 11 to become incident on limited portions of the fiber 1.

Figure 2:
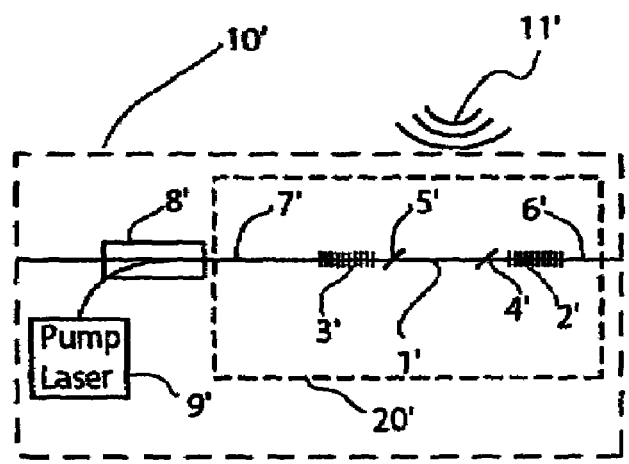
FIG. 2 is a schematic block diagram of a second embodiment of the ultrasound sensor.
Figure 3:
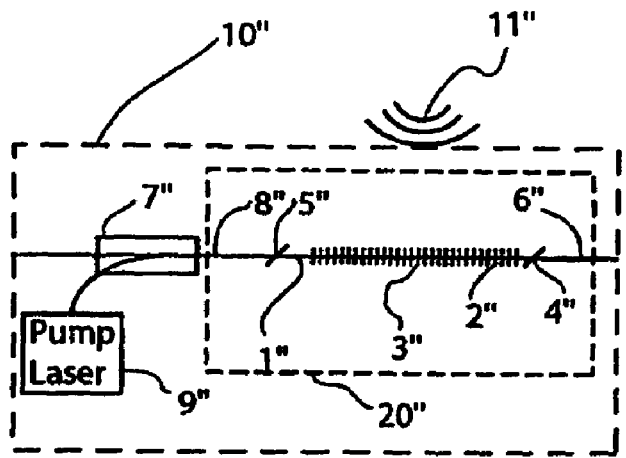
FIG. 3 is a schematic block diagram of a third embodiment of the ultrasound sensor.

FIGS. 2 and 3 illustrate alternative embodiments of the sensor. In the embodiment of FIG. 2 the Bragg gratings 2 and 3 are written in the normal fibers 6 and 7. In the embodiment of FIG. 3 a single fiber Bragg grating 2 with a phase shift 3 around its mid-point is fabricated in the active fiber 1. The two alternative embodiments also have birefringence and respond similarly to acoustic waves as the embodiment of FIG. 1.

Also, in alternative embodiments optical fiber coupler 8 can be a fiber wavelength-division multiplexer or a thin-film wavelength-division multiplexer.

Figure 4:
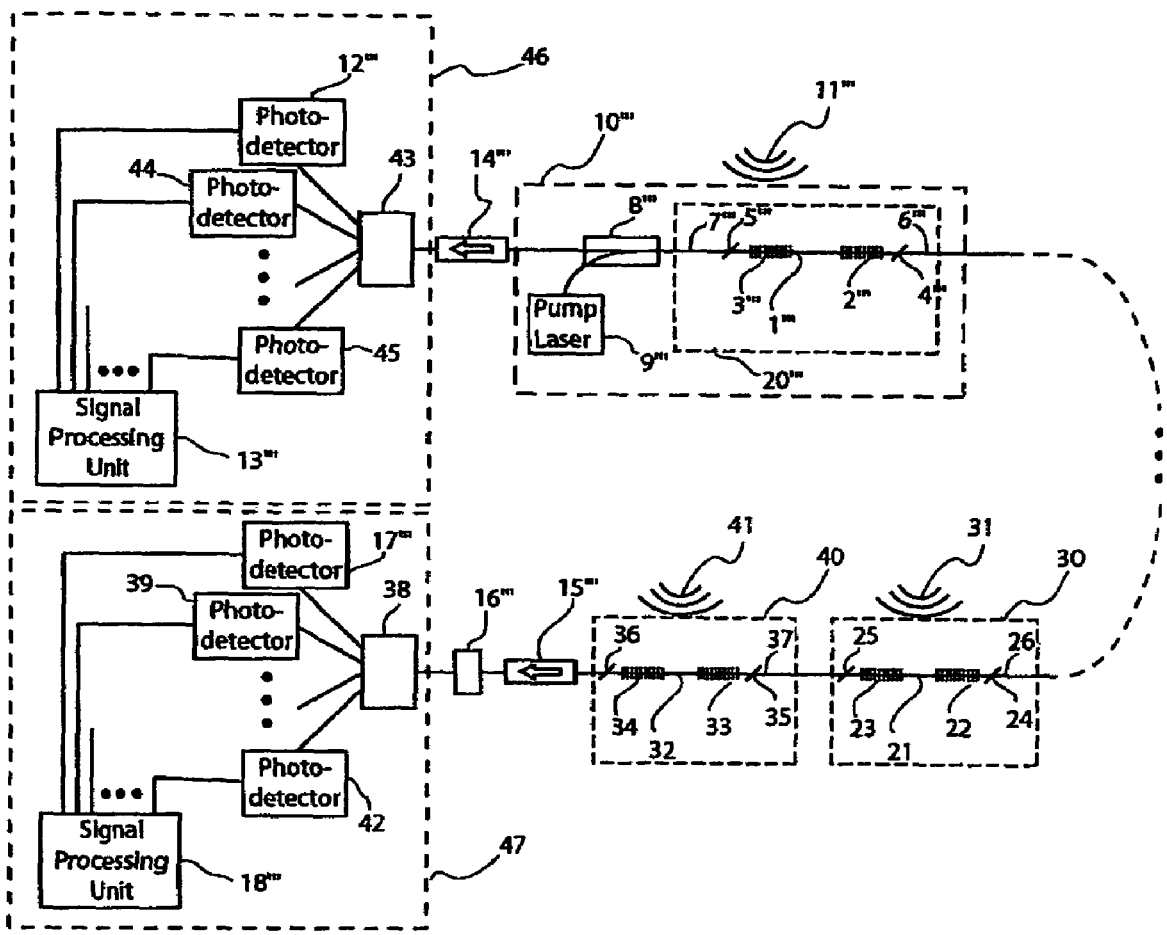
FIG. 4 is a schematic block diagram of an ultrasound measurement device having a plurality of ultrasound sensors connected in series.
Figure 6:
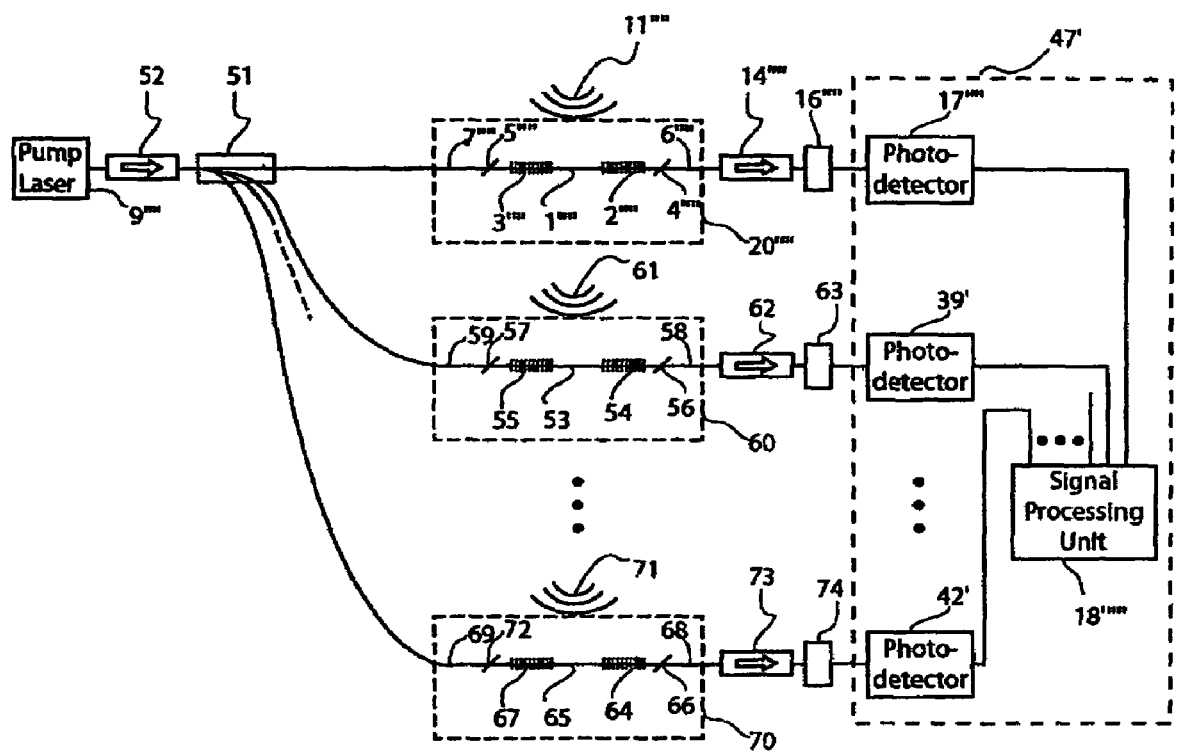
FIG. 6 is a schematic block diagram of an ultrasound measurement device having a plurality of ultrasound sensors connected in parallel.

An ultrasound measurement device can be implemented with a single sensor, as described above, or using an array of sensors 10, 30 and 40. Such a sensor array is used to detect multiple acoustic sources simultaneously. An alternative use of a multi sensor array is for locating the position of an acoustic source using triangulation. Ultrasound measurement devices using an array of sensor are illustrated in FIGS. 4 and 6. Only three sensors are shown but more or lease could be used.

Referring to FIG. 4, the sensors 20, 30 and 40 are connected in series and emit light at different wavelengths. Pump power is delivered to all sensors from the same pump source 9. The signal power from all sensors is received either in the forward direction (the same direction as pump source), as indicated by the detection scheme 47, or in the backward direction as indicated by the detection scheme 46.

A wavelength-division demultiplexer 38, 43 routes the different wavelengths generated by the different sensors 20, 30 and 40 to its corresponding output port. Each output port of the wavelength-division demultiplexer 38, 43 is connected to a photo-detector. The signal processing unit is responsible for extracting, from all the photo-detectors, the output signals corresponding to the received acoustic pressures incident on each sensor in the array.

Figure 5:
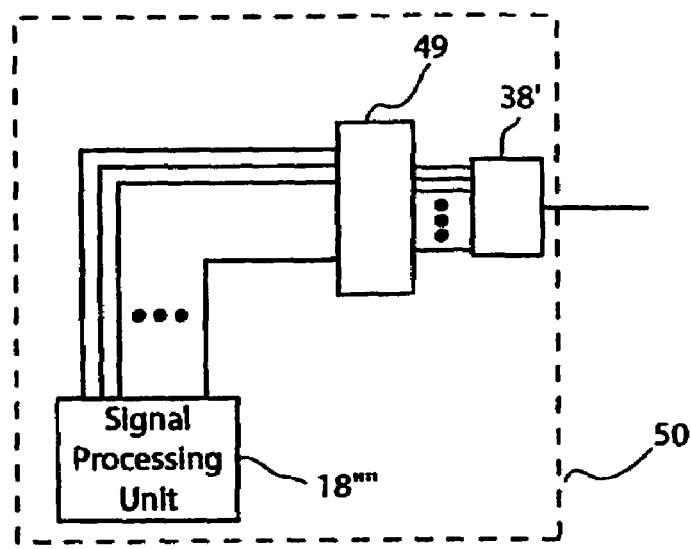
FIG. 5 is a schematic block diagram of a detection scheme using photo detector array.

FIG. 5 illustrates an alternative embodiment of the detection schemes 46, 47. In the alternative embodiment the detection scheme 50 includes a compact photo-detector array 49 at the output of wavelength-division demultiplexer 38.

In FIG. 6 the plurality of sensors are arranged in parallel. An optical power splitter 51 divides the optical power of the pump source 9 and delivers it to the parallel sensors 20, 60 and 70. In the parallel connection the emission wavelength of the sensors 20, 30 and 40 can be equal or otherwise.

Figure 8:
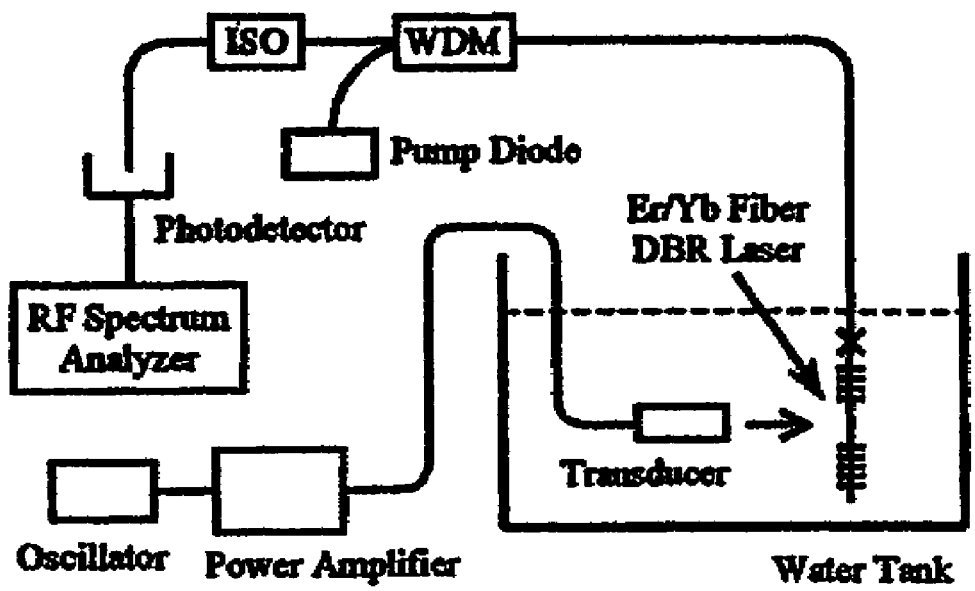
FIG. 8 is a schematic diagram of apparatus for testing the invention.

FIG. 8 shows an experimental setup used to test a sensor according to the invention. A distributed Bragg reflector (DBR) fiber laser comprises an Er/Yb co-doped fiber. Two 1550 nm gratings are written into the doped fiber with a separation of 10 mm. The first grating is 10 mm long with a reflectivity of larger than 99%. The second grating is 3 mm long with a reflectivity of around 90%. A 980 nm pump light is launched from the second (3 mm) grating side through a wavelength division multiplexer (WDM). An optical isolator is placed at the laser output to eliminate any unwanted reflection. The laser operated robustly in single longitudinal mode and dual polarizations with a frequency difference of 854 MHz.

Figure 9:
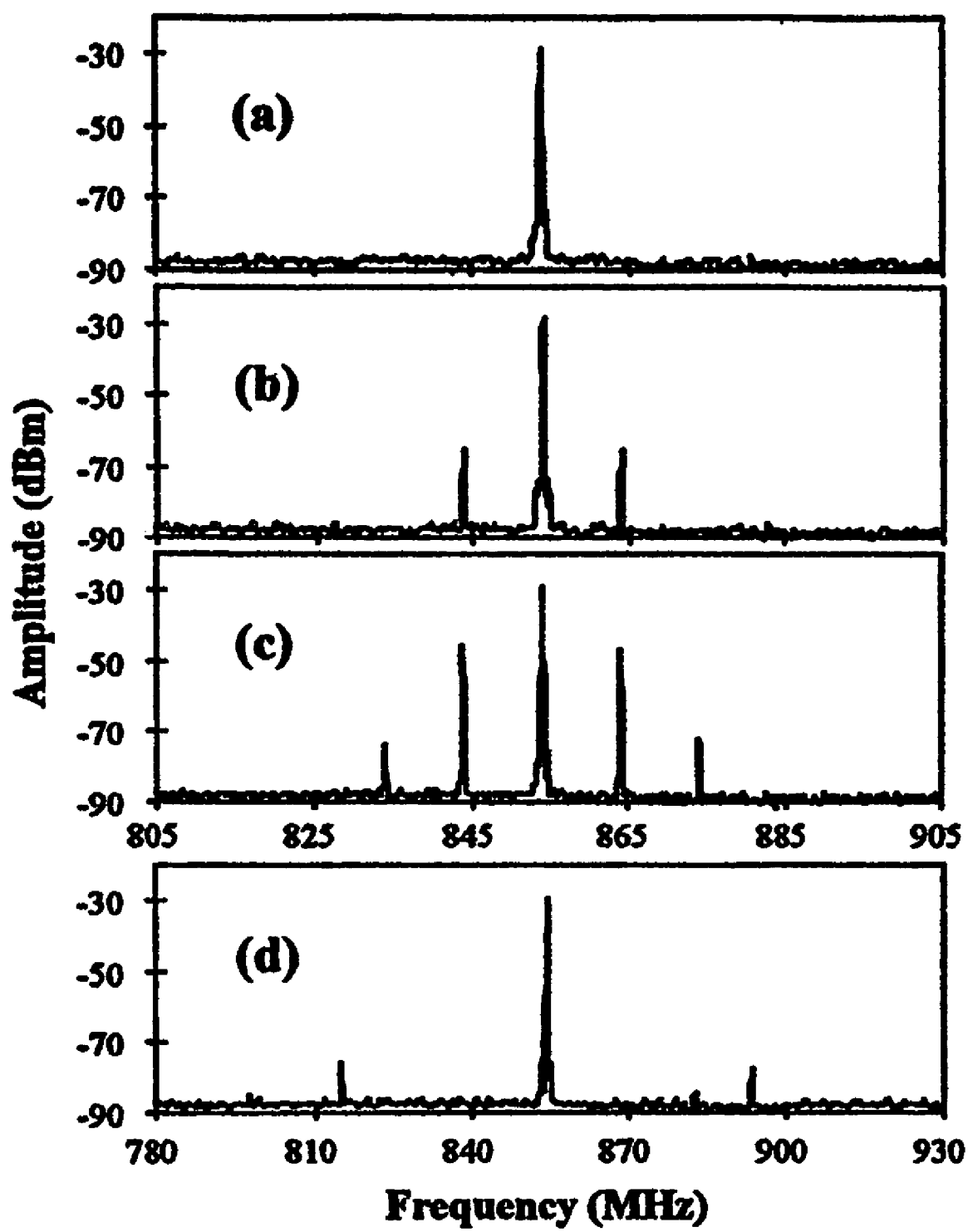
FIG. 9 shows graphs of the ultrasound sensor output.

Graph (a) in FIG. 9 shows the beat signal produced by the test sensor. The maximum beat signal was obtained when the pump power was about 46 mW. In the test, the pump was set to this level to achieve a high signal to noise ratio. At this pump power setting the laser output power was 2.5 mW.

The DBR fiber laser was fixed to a metal frame and placed in a tank filled with water. A plane ultrasound field was generated by an acoustic transducer driven in continuous mode. The sensor was positioned in the field of the transducer perpendicular to the ultrasound propagation direction. Graphs (b) and (c) in FIG. 9 show the beat signal spectrum recorded by the RF spectrum analyzer when the acoustic transducer was driven at 10 MHz with different driving voltages. The sidebands are clearly visible and increase with the amplitude of the ultrasound.

Figure 10:
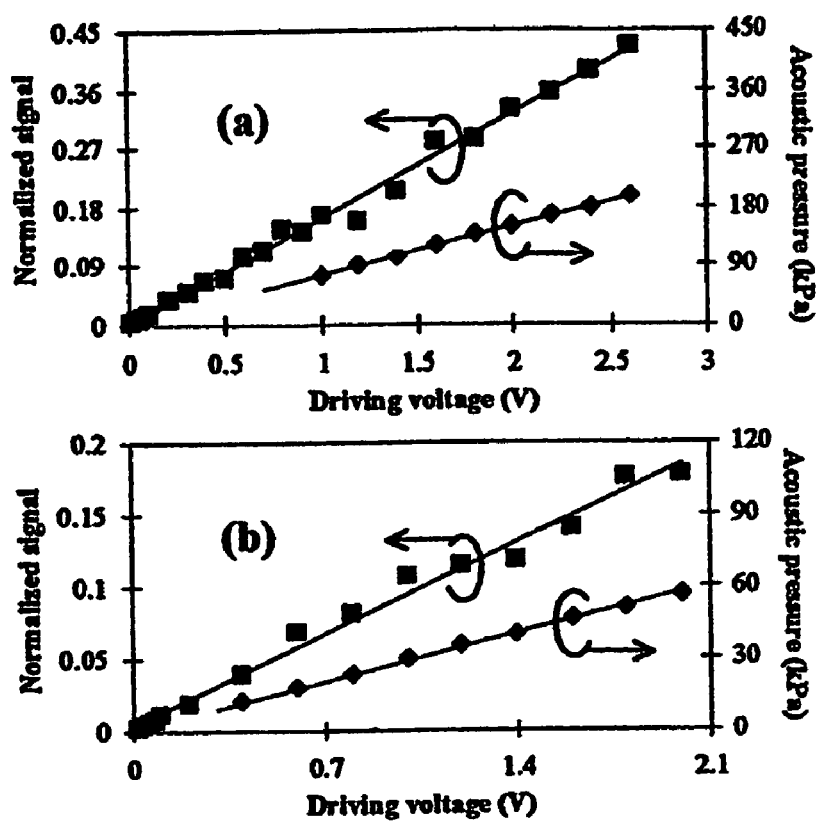
FIG. 10 shows graphs of normalized sensor output against driving voltage.

Graphs (a) and (b) in FIG. 10 show, using square (-■-) points, the measured normalized magnitude of the first-order sideband as a function of the driving voltage at 10 MHz and 20 MHz, respectively. The magnitudes were normalized with the carrier magnitude. There is a linear relationship between the voltage and the normalized side-band magnitude. The acoustic transducer was calibrated using a commercial PVDF membrane hydrophone and the results are also shown in FIG. 10 using diamond (-♦-) points. The ultrasound pressure is a linear function of the driving voltage. This indicates that the sensor has a linear response to the ultrasound pressure. It is expected that the sensor is capable of detecting much higher frequency ultrasound. Graph (d) in FIG. 9 shows a beat signal spectrum when the acoustic transducer was driven at 40 MHz. However, the bandwidth of the transducer is 20 MHz and so the acoustic pressure generated is very small.

Figure 11:
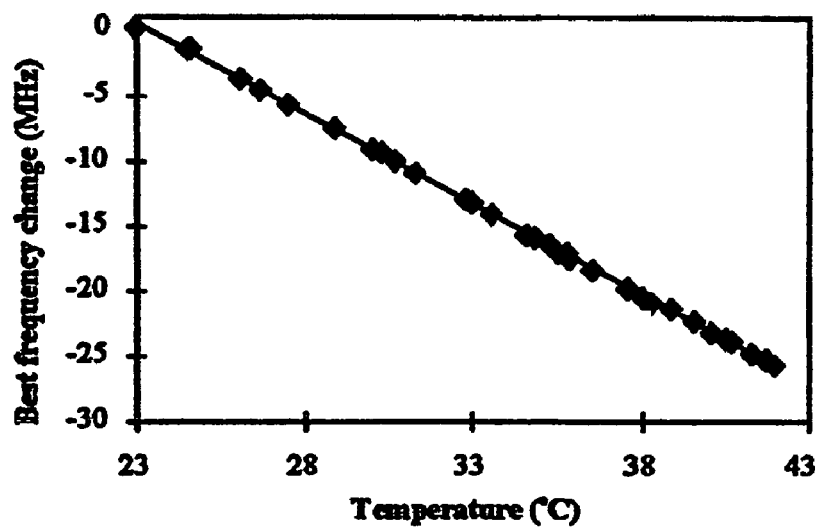
FIG. 11 is a graph of the relationship between the ultrasound sensor output and temperature.

FIG. 11 shows the relationship between measured carrier frequency and temperature. Since the fiber refractive index increases while both the lasing frequency and the fiber birefringence decrease with increasing temperature, the carrier frequency is inversely proportional to temperature. A linear regression analysis of the data yields a temperature coefficient of −1.38 MHz/deg. C.

Where in the foregoing description reference has been made to integers or elements having known equivalents then such are included as if individually set forth herein.

Embodiments of the invention have been described, however it is understood that variations, improvements or modifications can take place without departure from the spirit of the invention or scope of the appended claims.

What is claimed is:

1. An ultrasound sensor comprising:
   an optical fiber having a single continuous active portion with first and second ends and high birefringence, and two non-active portions located at the first and second ends of the active portion respectively, and
   a grating provided in the fiber.

2. The sensor of claim 1 wherein the grating is in the active portion of the fiber.

3. The sensor of claim 2 wherein the grating comprises first and second gratings spaced apart and having overlapping spectrums.

4. The sensor of claim 3 wherein the first grating is 10 mm long with a reflectivity of larger than 99% and the second grating is 3 mm long with a reflectivity of substantially 90%.

5. The sensor of claim 1 wherein the active portion is an Er/Yb co-doped fiber.

6. An ultrasound measurement device comprising:
   an optical fiber having a single continuous active portion with first and second ends and high birefringence, and two non-active portions located at the first and second ends of the active portion respectively,
   a grating provided in the fiber,
   an excitation source for the fiber, and
   an analysis unit connected to the fiber.

7. The device of claim 6 wherein the excitation source is a 980 nm pump laser.

8. The device of claim 6 wherein the analysis unit includes a photo-detector and a signal processor.

9. The device of claim 6 further including a shield over or about the fiber, the shield having an opening for permitting an ultrasound wave to become incident on the fiber.

10. The device of claim 6 including two or more of said fibers connected in series or parallel.

11. An ultrasound sensor comprising:
    a high birefringence optical fiber comprising a single continuous strand of active doped optical fiber; and
    first and second gratings located in the doped optical fiber and having overlapping spectrums.

12. The sensor of claim 11 wherein the first grating has a reflectivity of larger than 99% and the second grating has a reflectivity of substantially 90%.

13. The sensor of claim 11 wherein the gratings are 1550 nm gratings.

14. The sensor of claim 13 wherein the gratings are located 10 mm apart and the first grating is 10 mm long with a reflectivity of larger than 99% and the second grating is 3 mm long with a reflectivity of substantially 90%.

15. The sensor of claim 14 wherein the active portion is an Er/Yb co-doped fiber.

* * * * *